United States Patent [19]

Kowalski et al.

[11] 3,735,035

[45] May 22, 1973

[54] CIRCUIT FOR SELECTIVELY LIMITING VOLTAGE MAGNITUDES

[75] Inventors: Walter Kowalski, Franklin Park; Jude P. Schmidt, Chicago, both of Ill.

[73] Assignee: Motorola, Inc., Franklin Park, Ill.

[22] Filed: May 13, 1971

[21] Appl. No.: 143,123

[52] U.S. Cl...............178/7.1, 178/DIG. 12, 307/237, 178/7.3 R

[51] Int. Cl...............................H04n 5/14, H04n 5/20

[58] Field of Search..................178/7.1, 7.2, DIG. 29, 178/DIG. 12; 307/237, 264; 328/168, 169, 171, 173

[56] References Cited

UNITED STATES PATENTS

| | | | |
|---|---|---|---|
| 3,344,284 | 9/1967 | Thompson | 307/237 |
| 2,879,330 | 3/1959 | Procter | 178/DIG. 12 |
| 3,374,312 | 3/1968 | Thomas | 178/7.3 S |

*Primary Examiner*—Robert L. Richardson
*Attorney*—Mueller & Aichele

[57] ABSTRACT

The limiting circuit selectively controls the maximum peak magnitude of a signal with respect to a reference derived from the normal peak magnitude of the signal. Included in the circuit is an electron control device connected between a capacitor and a path having the signal thereon. The electron control device is rendered conductive by the signal which charges the capacitor to the reference level. A voltage controlled switch has a first electrode coupled to the signal path and a second electrode coupled to the capacitor. The switch normally provides a high impedance but in response to the maximum signal magnitudes causing a threshold voltage of a selected value between the first and second electrodes thereof, it provides a low impedance which clamps the instantaneous, maximum magnitudes of the signal on the path to a value which varies directly with the reference level.

11 Claims, 5 Drawing Figures

INVENTORS
WALTER KOWALSKI
JUDE P. SCHMIDT
BY Mueller & Aichele
ATTYS.

CIRCUIT FOR SELECTIVELY LIMITING VOLTAGE MAGNITUDES

BACKGROUND OF THE INVENTION

Clipping or magnitude limiting circuits are utilized in many modern electronic systems. For instance, such circuits are sometimes included in television cameras or receivers. More specifically, closed-circuit television systems, employed in many industrial and surveillance applications, includes a camera directed at a scene to be viewed and, perhaps, a plurality of monitors or receivers coupled to the camera through transmission lines.

The camera develops video signals, having instantaneous magnitudes which are proportional to the brightness of corresponding portions of the televised scene, and synchronization pulses for respectively controlling the intensity and the scan of electron beams in the monitors. Each of the monitors includes circuitry responsive to the average magnitude of the video signal, which is indicative of the average brightness of the scene being televised, to develop bias levels which maintain picture quality as the average brightness changes. If the ratio between the instantaneous magnitude of the video signal and its average level exceeds a particular value, which depends upon the design of the monitor, the bias level in the monitor is disrupted thereby causing darkening or other defects in the received picture. These instantaneous video signals of excessive magnitude are referred to as "peak white signals" because they occur as the camera is developing a video signal in response to headlights, street lights, the reflection of the sun, etc. The problem created by peak white signals may be acute in situations where scene lighting is not controlled.

In the past, clamping circuits have been included in television cameras to limit the magnitudes of the peak white video signals with respect to a manually adjustable voltage reference level. Although such circuits perform satisfactorily in applications where a cameraman constantly adjusts the clipping level, if the camera is placed where it is inconvenient to constantly adjust the reference level with change in scene brightness, any particular chosen level results in a compromise in monitor picture quality. For example, suppose that the reference level is chosen to be low so that peak white signals do not disturb critical bias levels during scenes of low average brightness. As a result, video signals of normal magnitude are clipped during scenes of high average brightness, thus destroying detail.

SUMMARY OF THE INVENTION

One object of the invention is to provide an improved solid state, magnitude limiting circuit which is inexpensive, light weight and compact.

A further object is to provide a clipping circuit which self-adjusts its clipping level in a predetermined manner with respect to the magnitude of the signal being clipped.

Another object is to provide a clipping circuit which is suitable for use in a television camera or monitor-receiver which automatically limits the maximum instantaneous magnitudes of video signals with respect to a reference level which is a function of the normal peak white magnitude of the video signal.

In brief, the clipping or magnitude limiting circuit of one embodiment of the invention is adapted to be connected between a signal path and a terminal providing a first reference potential. The maximum magnitude of signals which occur on the signal path and have a given polarity are limited by the clipping circuit, to a value which is proportional to the normal peak magnitude of the signals. The clipping circuit is comprised of first and second parallel branches. The first parallel branch includes an electron control device having an input terminal coupled to the signal path. A capacitor is connected between the output terminal of the electron control device and the terminal providing a first reference potential. The electron control device allows current flow in response to the signals having the given polarity. This current flow charges the capacitor to a second reference level which varies with the normal peak magnitude of signals having the given polarity. The second parallel branch of the clipping circuit includes a voltage controlled switch device having a first electrode coupled to the signal path, a second electrode coupled to the capacitor and a third electrode connected to the terminal providing the first reference potential. The switch device normally provides a high impedance between its first and second electrodes. However, if a threshold voltage of predetermined magnitude is developed between its first and second electrodes in response to a triggering voltage, the device provides a low impedance which clamps the maximum instantaneous magnitudes of the signals on the path to a value which is a predetermined amount greater than the second reference level. The triggering voltage is developed only if the instantaneous magnitude of a portion of the signal plus the voltage drop across the first electron control device exceeds the threshold voltage of the switch device plus the second reference level.

DETAILED DESCRIPTION OF THE PREFERRED EMBODIMENT

Figure 1:
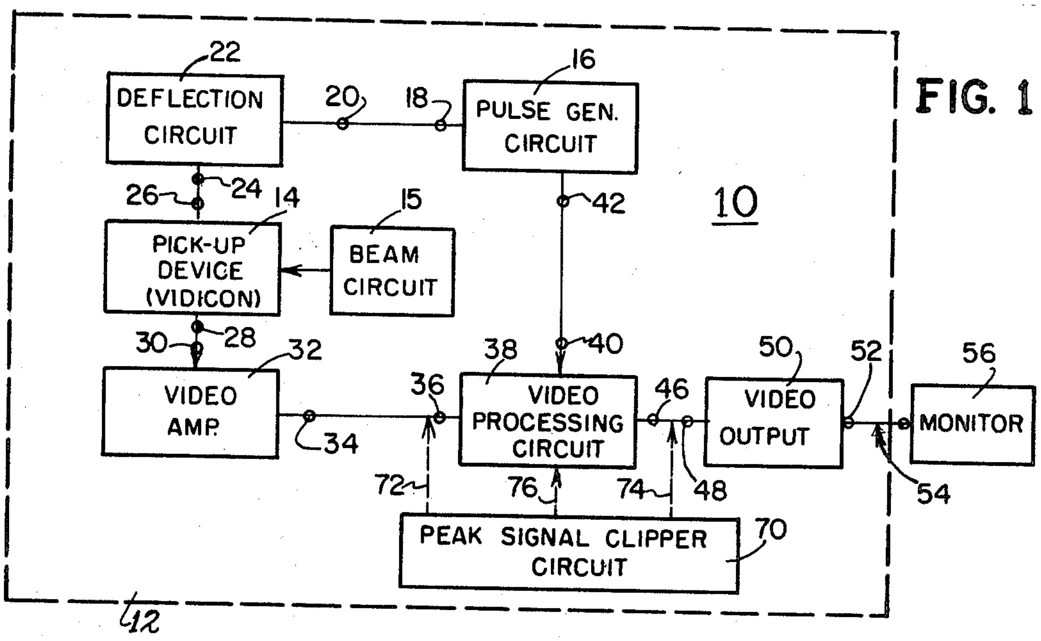
FIG. 1 is a block diagram of a television camera in which the magnitude limiting circuit of one embodiment of the invention may be employed.

A simplified block diagram of television camera 10 is included in dashed block 12 of FIG. 1. A scene viewed by the camera is focused through an optical system onto the face of a pick-up device or vidicon tube 14. Pulse generating circuit 16 develops timing signals at first output 18 thereof which are coupled to the input 20 of deflection circuit 22. Deflection signals developed at output 24 of deflection circuit 22, in response to the timing signals, are applied to input 26 of vidicon 14. These deflection signals move an electron beam provided by circuit 15 across the face of the tube at a horizontal frequency, e.g. 15,750 Hertz (Hz), and upward at a vertical frequency, e.g. 60 Hz.

At each momentary position of the beam, a current is developed which has a magnitude that is proportional to the light intensity created by the image of the scene at that point on the face of the vidicon tube. This current is passed through a load resistor to develop a video signal voltage thereacross which is coupled from vidicon output terminal 28 to input terminal 30 of video amplifier 32. Output terminal 34 of the video amplifier is connected to first input 36 of video processing circuit 38. Second input 40 of video processing circuit 38 is connected to second output 42 of pulse generating circuit 16. Video processing circuit 38 receives blanking and synchronizing pulses or timing signals from pulse generating circuit 16 and amplified video signals from video amplifier 32. These signals are combined in video processing circuit 38 to form a composite video signal, such as that illustrated by waveform 44 of FIG. 2, at its output 46. Input 48 of video output stage 50 is connected to output 46. Video output stage 50 develops an amplified composite video signal at output 52 of camera 10. Video utilizing circuits such as a transmitter, a video tape recorder, or monitors, may be coupled to output 52. In FIG. 1 transmission line 54 couples the amplified composite video signal from camera 10 to monitor 56 which recreate the scene being viewed by vidicon 14.

Figures 2, 3:
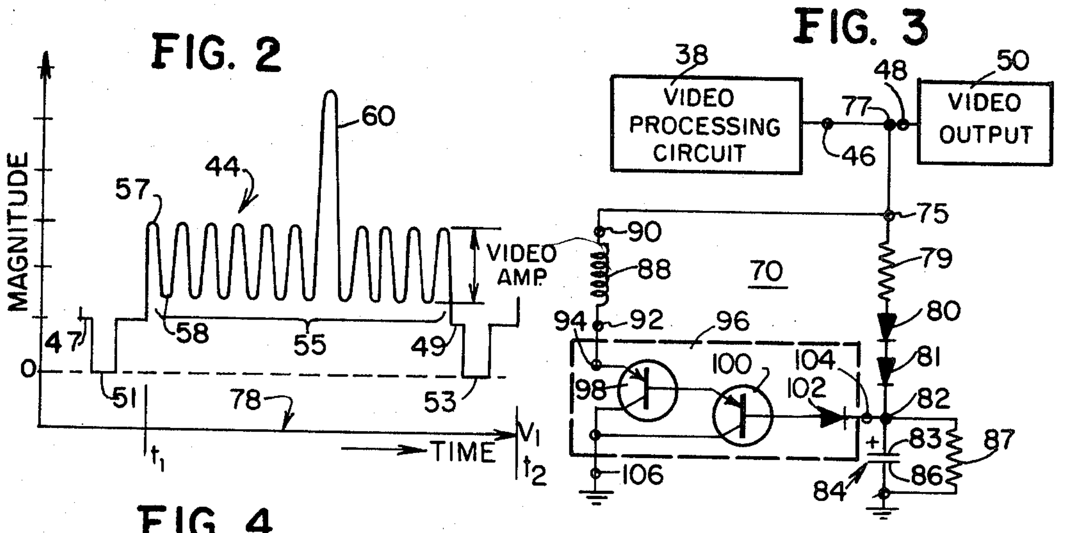
FIG. 2 is a waveform of a video signal including a peak white signal which would occur at the output of the camera of FIG. 1 if a magnitude limiting circuit was not utilized therein.
FIG. 3 is a part block and part schematic diagram of a magnitude limiting or clipping circuit of one embodiment of the invention.

Composite video signal 44 of FIG. 2 includes signals which synchronize blanking and scanning, and control the intensity of the electron beam utilized in the cathode ray tube (CRT) of monitor-receiver 56, which may be similar to a conventional television receiver with the radio frequency sections deleted therefrom. Pulses 47 and 49 of FIG. 2 are successive blanking signals which shut off the beam employed in the CRT of monitor 56 when the beam of vidicon 14 is shut off between lines. Successive horizontal synchronization pulses 51 and 53 insure that at times T1 and T2, when the blanking pulses allow the CRT beam to come on, that the beam is properly aimed at desired points at the ends of the lines to be scanned. Video signal 55, which exists in the time interval between times T1 and T2 has an instantaneous magnitude which is proportional to the instantaneous brightness of the image or scene encountered on the corresponding horizontal line of vidicon 14 along which the beam thereof has been swept.

More specifically, pulse 57 indicates that as the camera beam began its journey at one end of the line, represented by video signal 55, it encountered a white elemental area created on the face of the vidicon by the scene being televised. Pulse 58 indicates that adjacent to the white spot there was a black area created on the face of the vidicon, etc. Pulse 60 indicates that after the beam was swept a little over half way across the face of the vidicon, it encountered an exceptionally bright spot which may have been caused by a light shining on the camera, a reflection of the sun, a fire, etc. Pulse 60 is called a "peak white signal." The difference between the magnitude of pulse 58, which represents the black level and the magnitude of blanking pulse 47 is called the "set-up level."

The normal peak magnitudes or normal white level of video signal 55 of FIG. 2 is proportional to the average light intensity or overall brightness of the scene being televised. The magnitude of pulse 57 is representative of the normal peak magnitude or normal white level of video signal 55. For instance, if the televised scene occurs in bright sunlight, the normal peak level of the video signal is increased with respect to what it would be if the televised scene had occurred in the natural light of dusk or night. To compensate for the variation in the overall brightness of televised scenes so called "black level stabilization" is employed in monitors. This stabilization insures that the camera video signal level or magnitude corresponding to a black elemental area of the televised scene, e.g. the magnitude of pulse 58, causes a corresponding black elemental area in the reproduced image at the monitor. Consequently, all of the shades of the televised image are then correctly reproduced by the monitor. Black level stabilization circuits either directly employ the direct current or average overall level of the video signal, or they derive an analog signal therefrom to develop a control signal which adjusts the grid-to-cathode bias in the CRT of the monitor.

A peak white signal such as pulse 60 of FIG. 2 may have a magnitude of 5 or 6 times the magnitudes of a normal white signal such as that represented by pulse 57. Hence, peak white signals tend to increase the average or DC component of the video signal thereby causing the black level set by the black level stabilization to be increased above what it should be. This upset in bias by peak white signals may result in a darkening or total blacking out of the received picture. Peak white signals or greater relative magnitude can be tolerated if the average brightness of the televised scene is high, than if the average brightness is low.

To maintain picture quality it is advantageous to keep the ratio of the magnitude of the peak white signal to the magnitude of the average video signal below a particular value. Since the magnitudes of the normal white signals are greater than the average magnitude of the video signal, the ratio of the magnitude of the peak white signal to the average magnitude of the normal white signal is less than the ratio of the magnitude of the peak white signal to the average magnitude of the video signal. Thus, by deriving a control reference from the average normal white signal, more effective control may be maintained over the maximum ratio of the magnitude of peak white to the magnitude of the average video than if the control reference was derived directly from the average magnitude of the video signal.

To eliminate the undesirable effects on the picture caused by peak white signals, peak signal clipper 70 of FIG. 3 of one embodiment of the invention may be employed either in camera 10 or in monitor 56. As designated by dashed arrows 72, 74 and 76 of FIG. 1, peak signal clipper 70 may be inserted either before input terminal 36, after the output terminal 46 or within video processing circuit 38. The peak signal clipper selectively and automatically limits the ratio between the maximum allowable magnitude for a peak white signal and the average or direct current magnitude of the video signal by limiting the ratio between the maximum allowable magnitude for a peak white signal and the peak amplitudes of the normal white signal.

Figure 4:
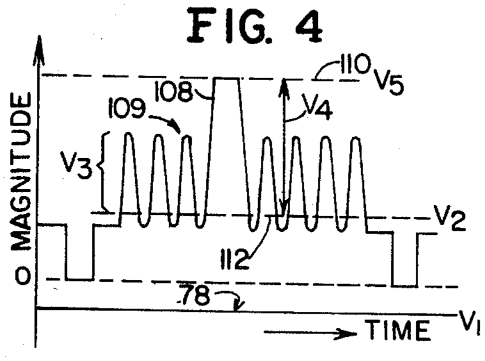
FIG. 4 is a waveform illustrating the results of the clipping operation of the circuit of FIG. 3 under high average light level conditions.
Figure 5:
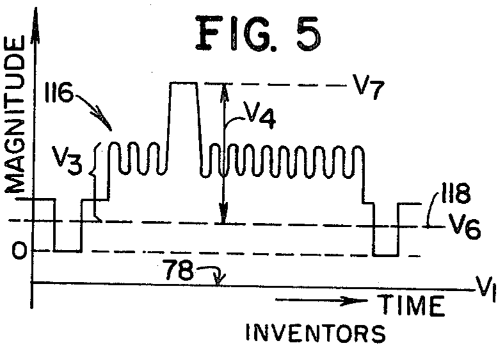
FIG. 5 is a waveform illustrating the results of the clipping operation of the circuit of FIG. 3 under low average light level conditions.

Input terminal 77 of the clipping circuit is connected, for instance, to the signal path between output 46 of video processing circuit 38 and input terminal 48 of video output circuit 50. Two parallel branches are connected between the signal path and a ground terminal or the output terminal of a supply providing a ground potential. A first reference level $V_1$ of FIGS. 2, 4 and 5 is designated by reference number 78. Level $V_1$ is not necessarily at the ground potential. The first parallel path includes a first electron control means comprised of resistor 79, which has one end connected to terminal 77 and the other end connected to diodes 80 and 81 which are poled to be rendered conductive in response to video signals having the given polarity, e.g., positive, which corresponds to the relative polarity of the white portions with respect to the black portions of the televised scene. Output terminal 82 of the first electron control means is connected to first plate 83 of capacitor 84. Second plate 86 of capacitor 84 is connected to the ground or reference level supply. Resistor 79, diodes 80 and 81, and capacitor 84 cooperate to form a rectifying or integrating circuit. Capacitor 84 is charged by the current through the first electron control means to a second reference level which is equal to the magnitude of the normal peak of the video signal minus the voltage drops across the first electron control device. The second reference level is utilized to adjust the clipping or magnitude limiting level.

Resistor 79, controls the charging time constant of capacitor 84. It is selected to have a relatively low value, so that the second reference level does not change substantially in response to a peak white signal having a short duration. The value of resistor 79 is large enough to limit the current through diodes 80 and 81 to a safe value when the clipping circuit is first energized at which time capacitor 84 provides a short circuit. Resistor 87, which is connected in parallel with capacitor 84, controls the discharge time constant thereof. The valve of resistor 87 may be relatively large as compared to the value of resistor 79 so that the second reference level remains relatively constant over a selected number of lines, but its value must be small enough to allow the second reference potential to vary in correlation with change in the average level of the video signal over a selected number of frames.

The second branch of the clipping circuit is comprised of inductor 88 which has a first terminal 90 connected to the signal path and a second terminal 92 connected to first electrode 94 of voltage responsive switch means 96 which is comprised of Darlington connected transistors 98 and 100 and quick recovery diode 102. The emitter of transistor 98 is connected to first electrode 94. Second electrode 104 of voltage responsive switch means 96 is coupled to first plate 83 of capacitor 84. Diode 102 couples the base of transistor 100 to second electrode 104. Third electrode 106 of voltage responsive switch 96 is connected to the ground or other terminal providing the first reference potential and to the collectors of transistors 98 and 100. The emitter of transistor 100 is connected to the base of transistor 98. Diodes 80 and 81 are oriented or poled so that the thermal currents generated therein tend to compensate for the thermal currents generated by the base-to-emitter junctions of transistors 98 and 100 and the anode-to-cathode junction of diode 102. Hence, clipping circuit 70 is suitable for use over wide temperature variations.

Under normal video signal conditions i.e., when no peak white signals are present, capacitor 84 will charge up to the second reference level, $V_2$ of FIG. 4 which is a fixed amount $V_3$ below the normal white level of video signal 109. The voltage drops across resistor 79, diodes 80 and 81 determine fixed amount, $V_3$ to be about 1 volt. Additional diodes could be added in series with diodes 80 and 81 to increase $V_3$ if desired. Thus, under normal video signal conditions a potential of about 1 volt is impressed between the first and second electrodes of switch means 96 which are bridged by the series circuit formed by the base-to-emitter junction of transistor 98, the base-to-emitter junction of transistor 100 and the anode-to-cathode junction of diode 102. Since the turn-on level, $V_4$ of these three series junctions may be on the order of a volt and a half, under normal video signal conditions a high impedance is created between the first and second electrodes Furthermore, a threshold which is equal to the difference between $V_4$ and $V_3$ is created between the first and second electrodes. This threshold is overcome if the instantaneous magnitude of the video signal rises more than a half volt above the normal white level.

Under abnormal operating conditions, peak white signals, e.g., pulse 60 of FIG. 2, occur which tend to have instantaneous magnitudes in excess of a half volt above the normal white level. During the period of time that the magnitude of the video signal tends to rise above threshold value, transistors 98 and 100, and diode 102 are rendered conductive and provide a low impedance between first electrode 94 and second electrode 104. During the time that switching means 96 is conductive, inductor 88 provides a relatively high impedance at the higher video frequencies so that detail is preserved in the picture. The low impedance of the switch circuit clamps or limits the magnitude of the peak white signal to a level, $V_5$ which is a predetermined amount $V_4$ above the second reference level. Referring to FIG. 4, the magnitude of peak white signal 108 is limited to a level $V_5$, designated by reference number 110, which is a predetermined amount, $V_4$ above the second reference level $V_2$, designated by reference number 112. Thus, as the second reference level changes with the normal white level, the clipping level also changes. Switch means 96 becomes nonconductive as the amplitude of the peak white signal falls below the threshold value. Because of the relatively high impedance presented by the Darlington configuration between second electrode 104 and third electrode 106, little charge is added to capacitor 84 during the times that switch circuit 96 is rendered conductive thereby tending to maintain the second reference potential at its proper level.

Video signal 109 of FIG. 4 is created in response to a scene having a relatively high overall brightness as illustrated by the difference between second reference level, $V_2$ and first reference level, $V_1$. Another video signal 116 is shown in FIG. 5. The relatively low magnitude of most of the white level of video signal 116 as compared to the corresponding portions of video signal 109 indicates that video signal 116 is created in response to a scene having a relatively low overall or average brightness. As a result, capacitor 84 is charged by signal 116 to a second reference voltage level, $V_6$, designated by reference number 118, which is substantially less than corresponding level $V_2$ of FIG. 4. The maximum magnitude or clipping level $V_7$, which is represented by dashed line 120 is equal to second reference level, $V_6$ plus the virtually constant threshold voltage $V_4$. Because second reference level, $V_6$ is a lower value than $V_2$, the clipping level, $V_7$ of FIG. 5 is lower than clipping level, $V_5$ of FIG. 4. Thus the ratio between the clipping level or maximum permitted amplitude of a peak white signal and the normal white level of the video signal is kept below a selected maximum value even though the white level of the video signal changes substantially in response to variation in overall scene brightness. Therefore, the clipping level is automatically adjusted by circuit 70 so that it moves down as overall brightness decreases thus keeping peak white signals from upsetting the black level bias in monitor 56 which is also at a low level. Moreover, the clipping level moves up with an increase in overall brightness so that video signals corresponding to normal white elemental areas of the transmitted scene are not clipped. Hence, the clipping circuit facilitates optimum picture quality under all over-all brightness conditions.

The clipping circuit of FIG. 3 has been employed in a plurality of commercially successful television cameras wherein it operated in a satisfactory manner. The components of the commercial clipping circuit have the following values or designations:

Resistor 79 = 8.2 kilohms

Diodes 80, 81 and 102 are Motorola type 48D 824420 C 18

Capacitor 86 = 3.3 micro farads

Resistor 87 = 1 megohm

Inductor 88 = 16 microhenries

Transistors 98 and 100 are Motorola type M9548.

Thus a simple, inexpensive signal magnitude limiting or clipping circuit has been described which automatically adjusts its clipping level in proportion to the normal peak magnitude of the signal. Thus, the clipping circuit is useful in either television cameras or monitors, because it self-adjusts the clipping level with respect to overall brightness but not with respect to peak white signals. Moreover, the clipping circuit includes inherent temperature compensation so that it may be used over a wide temperature range.

We claim:

1. A clipping circuit adapted to be connected between a signal path and a first terminal providing a first reference potential for limiting the magnitudes of a signal, having a first polarity and occurring on the signal path, to a level which is a function of the normal magnitude of the signal, such clipping circuit including in combination:

electron control means having an input terminal adapted to be connected to the signal path and an output terminal, said electron control means allowing current flow in one direction in response to the signal;

capacitor means connected between said output terminal of said electron control means and the first terminal, said capacitor means providing at said output terminal a second reference potential which depends solely upon the normal magnitude of the signal in response to said current flow through said electron control means;

voltage controlled switch means having first and second electrodes, said switch means normally providing a high impedance between said first and second electrodes, said switch means providing a predetermined voltage between said first and second electrodes in response to a voltage applied between said first and second electrodes having a magnitude exceeding such predetermined voltage;

first circuit means coupling said first electrode of said switch means to said input terminal of said electron control means; and second circuit means coupling said second electrode of said switch means to said output terminal of said electron control means;

said voltage controlled switch means being rendered conductive in response to a signal having an instantaneous magnitude greater than said predetermined voltage above said second reference potential to limit the magnitude of the signal in the signal path to substantially said predetermined voltage above said second reference potential.

2. The clipping circuit of claim 1 wherein said capacitor means includes first and second plates, said first plate being connected to said output terminal of said electron control means, said second plate being connected to the first terminal providing the first reference potential.

3. The clipping circuit of claim 2 wherein said electron control means further includes a first resistor means connected in series with diode means between said input terminal and said output terminal thereof, said resistor means having a selected value which allows said reference level across said capacitor means to vary with the variation of the normal peak magnitudes of the signal over a preselected time.

4. The clipping circuit of claim 2 further including second resistance means connected between said first and second plates of said capacitor means, said second resistance means selectively controlling the discharge rate of said capacitor means.

5. The clipping circuit of claim 1 wherein said voltage controlled switch means further includes a third electrode which is adapted to be connected to the first terminal providing the first reference potential.

6. The clipping circuit of claim 5 wherein said voltage controlled switch means includes:

first transistor means having emitter, base and collector electrodes, said emitter electrode of said first transistor means being connected to said first electrode of said switch means, said collector electrode of said first transistor means being connected to said third electrode of said switch means;

second transistor means having emitter, base and collector electrodes, said emitter electrode of said second transistor means being connected to said collector electrode of said first transistor means; and diode means having first and second terminals, said first terminal of said diode means being connected to said base electrode of said second transistor means, said second electrode of said diode means being connected to said second electrode of said voltage controlled switch means.

7. The clipping circuit of claim 1 wherein said first circuit means includes an inductance means.

8. A limiting circuit which is adapted to be connected between a video signal path and a terminal providing a first reference potential and which limits the magnitude of peak white video signals to a value which is a function of the normal white magnitudes of the video signal, such limiting circuit including in combination:

electron control means having diode means connected between an input terminal adapted to be connected to the signal path and an output terminal, said diode means allowing current flow in one direction in response to each of the normal white magnitudes of the video signal;

capacitor means having a first plate connected to said output terminal of said electron control means and a second plate adapted to be connected to the terminal providing the first reference potential, said capacitor means being responsive to said current flow through said diode means to provide a second reference potential which varies automatically with changes in said normal white magnitudes of the video signal;

voltage controlled switch means having first, second and third electrodes, said switch means normally providing a high impedance between said first and second electrodes, said switch means providing a predetermined voltage between said first and second electrodes in response to a voltage applied between said first and second electrodes which has a magnitude exceed such predetermined voltage;

inductor means coupling said first electrode of said switch means to said input terminal of said first electron control device;

circuit means coupling said second electrode of said switch means to said first plate of said capacitor means; and means for coupling said third electrode of said switch means to the terminal providing the first reference potential;

said voltage controlled switch means being rendered conductive in response to the instantaneous peak white magnitudes of the video signal which reach a voltage greater than said predetermined voltage plus said second reference potential to limit the magnitudes of said peak white signals to said predetermined voltage plus said second reference potential.

9. The clipping circuit of claim 8 wherein said voltage controlled switch means includes;

first transistor means having emitter, base and collector electrodes, said emitter electrode of said first transistor means being connected to said first electrode of said switch means, said collector electrode of said first transistor means being connected to said third electrode of said switch means;

second transistor means having emitter, base and collector electrodes, said emitter electrode of said second transistor means being connected to said base electrode of said first transistor means, said collector electrode of said second transistor means being connected to said collector electrode of said first transistor means; and diode means having first and second terminals, said first terminal of said diode means being connected to said base electrode of second transistor means, said second electrode of said diode means being connected to said second electrode of said voltage controlled switch means.

10. The peak white clipping signal of claim 8 wherein said electron control means further includes first resistor means for limiting the charging time constant of said capacitor means so that said second reference level is virtually non-responsive to a peak white signal.

11. The peak white limiting circuit of claim 10 further including a second resistor means connected in parallel with said capacitor means for controlling the discharge time constant thereof so that said second reference level varies with changes in the average magnitudes of said normal white video signal.

* * * * *